United States Patent
Kikuchi et al.

[15] 3,690,229
[45] Sept. 12, 1972

[54] EXPOSURE CONTROL APPARATUS FOR PHOTOGRAPHIC CAMERAS

[72] Inventors: Tomio Kikuchi, Tokorozawa; Kiyoyuki Arai, Gyoda, both of Japan

[73] Assignee: Kabushiki Kaisha Kofaru, Itabashi-ku, Tokyo, Japan

[22] Filed: May 25, 1970

[21] Appl. No.: 40,118

[30] Foreign Application Priority Data

May 30, 1969 Japan ...................... 44/41668
June 6, 1969 Japan ...................... 44/44411

[52] U.S. Cl. ........................... 95/10 CT, 95/11.5 R
[51] Int. Cl. ........................ G03b 7/08, G03b 15/03
[58] Field of Search ..................... 95/10 C, 11.5 R

[56] References Cited

UNITED STATES PATENTS

| | | |
|---|---|---|
| 3,282,179 | 11/1966 | Stimson ...................... 95/10 C |
| 3,440,938 | 4/1969 | Stimson et al. ............. 95/10 C |
| 3,470,798 | 10/1969 | Mujakawa ................. 95/10 C |
| 3,502,011 | 3/1970 | Rentschler et al. ........ 95/10 C |
| 3,418,904 | 12/1968 | Wick et al. ..................... 95/10 |
| 3,528,350 | 9/1970 | Schmitt ...................... 95/64 X |

*Primary Examiner*—Samuel S. Matthews
*Assistant Examiner*—Michael L. Gellner
*Attorney*—Otto John Munz

[57] ABSTRACT

A lamp is positioned to face a photoconductive cell contained in an electronic shutter mechanism of a camera. This lamp is adapted to be lighted up prior to the luminescing of a flash device attached to the camera, by utilizing the synchronizing contacts. This luminescence from the lamp preliminarily irradiates the photoconductive cell to enhance its ability to respond to light. This arrangement not only will permit the lamp to be lighted up in association with the proper working condition of the flash device but also will enable the lamp to luminesce again at the end of a predetermined length of time from the luminescing of the flash device and also to be put out at the end of another predetermined length of time.

8 Claims, 4 Drawing Figures

FIG. 3b
FIG. 3a
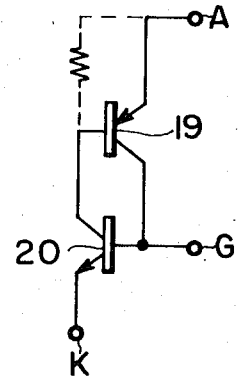
FIG. 4
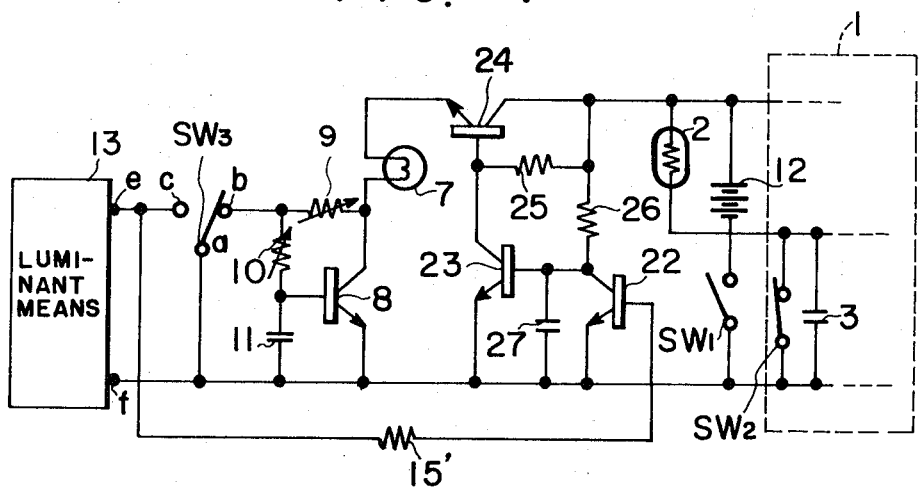
INVENTORS:
TOMIO KIKUCHI
KIYOYUKI ARAI
BY Otto [signature]
ATTORNEY

3,690,229

EXPOSURE CONTROL APPARATUS FOR PHOTOGRAPHIC CAMERAS

BACKGROUND OF THE INVENTION

1. Field of the Invention

The present invention is concerned with an exposure control apparatus for use in photographic cameras, and more particularly, it relates to an exposure control apparatus which is capable of satisfactorily responding to the light reflected from an object to be photographed which is illuminated by a luminescent source such as a flash unit.

2. Description of the Prior Art

In the field of exposure control apparatus for photographic cameras, or more briefly, in electronic shutter mechanism in general, it has been the practice in many cases to use photoconductive cells such as CdS cells. Such a photoconductive cell has the advantages on the one hand that it is superior in relative visibility characteristic, that it undergoes very little change with lapse of time, and also that it has a high sensitivity to light, but on the other hand it has the drawback that its responding ability to respond to light is poor. However, this inferiority in the responding ability of CdS photoconductive cells to light seldom gives give rise to problems in ordinary photography which is performed during the day-time when solar rays are used by a camera equipped with a conventional electronic shutter.

However, in photography in which an external flash source, such as a flash bulb or strobe is utilized, the responding ability of the photoconductive cell such as a CdS cell will have a great significance. More specifically, when the photoconductive cell presents a poor or a delayed response to light, the photograph taken will be over-exposed. Also, in photography with low illumination, it is quite possible that the electronic shutter might fail to function properly. Also, in photography utilizing a flash device as an external luminescent source, the light reflected from the object illuminated by the flash unit could often be found to be very weak in intensity, depending on the condition in which the object to be photographed is arranged, resulting in a long period of exposure time before the amount of light received by the photoconductive cell reaches a predetermined level, almost completely independent of the inherent ability of the photoconductive cell to respond to light. If this length of exposure time is greater than, for example, one thirtieth of a second which is accepted as being the maximum limit of time allowed for an exposure to be performed by a camera supported by hand, the resulting photograph will come out as a blurred picture unless a tripod is used. If the flash unit has to be used in photography, and if this flash unit happens to be out of order, and if the user of the camera takes a photograph without being aware of this fact, then the exposure control apparatus, i.e., the electronic shutter, will naturally function in the same manner as that in a photography wherein no flash unit is used. Although a proper exposure might be obtained if a tripod is used, the resulting photographs which are taken with a hand-supported camera will invariably be under-exposed if the photographs are taken within the limits of time allowed for a hand-supported camera.

These various drawbacks encountered in photography performed using a flash unit will be solved by observing the following three basic points: (1) enhancing the response of the photoconductive cell to light: (2) completing the exposure within a certain length of time, for example, within one thirtieth of a second; and (3) obtaining an indication from a device such as a lamp to show that the flash unit is not in order.

SUMMARY OF THE INVENTION

It is, therefore, an object of the present invention to provide an exposure control apparatus for photographic cameras, by arranging that a luminescent member, such as a lamp, is positioned to face a photoconductive cell and is caused to be lighted up during the initial stage of the shutter releasing operation during an exposure. Thus, it uses the lamp to preliminarily irradiate the photoconductive cell before the latter is subjected to light from the object to be photographed, thereby enhancing the ability of the photoconductive cell to respond to light by the activation of this cell through said preliminary irradiation. This enables the photoconductive cell to respond satisfactorily when it is subsequently subjected to the light reflected from the object illuminated by the light from the flash unit during the exposure.

Another object of the present invention is to provide an exposure control apparatus for photographic cameras which insures that, when the light intensity measurement or the exposure time of the exposure control apparatus during and after the use of a flash unit continues beyond the limited exposure time allowed for a hand-held exposure, the lamp is caused to luminesce again at the end of a predetermined length of time to thereby irradiate the photoconductive cell again so that the shutter blades may be coercively closed at said end of the predetermined length of time.

Still another object of the present invention is to provide an exposure control apparatus for photographic cameras which is operative so that, when the flash unit is in proper operating condition an open circuit voltage appears in the synchronizing contacts provided on the camera side to which the flash unit is attached, and the lamp is lighted up manually only when said voltage signal is present so that the good operating condition of this flash unit may be confirmed in association with the luminescence of the lamp.

Yet another object of the present invention is to provide various electronic circuit arrangements for attaining the aforesaid objects.

BRIEF DESCRIPTION OF THE DRAWINGS

FIGS. 3a and 3b are diagrams showing that two equivalent units, i.e., a transistorized circuit and a silicon controlled rectifier, are equivalent to each other;

FIG. 4 is a circuit diagram showing still another embodiment of the present invention.

DESCRIPTION OF THE PREFERRED EMBODIMENTS

Figure 1:
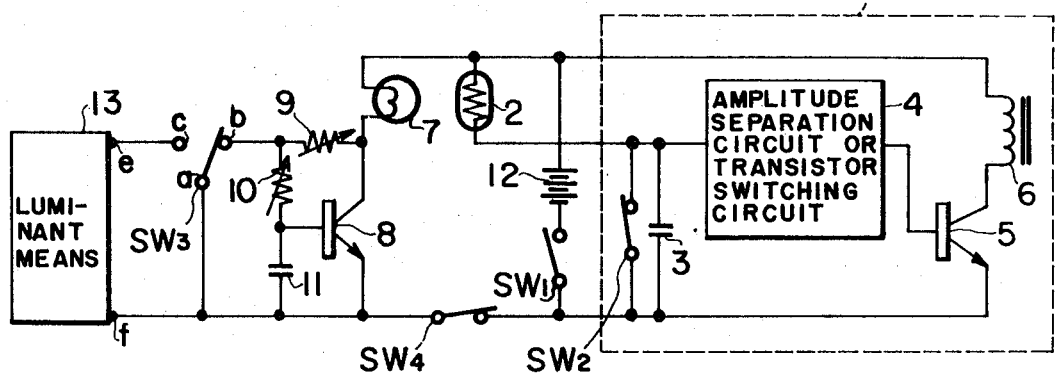
FIG. 1 is an electronic circuit diagram showing one embodiment of the present invention.

In the drawings, the circuitry contained within a dotted block 1 represents generally a known exposure control circuit for an electronic shutter, for use in photographic cameras. In the drawings, a photoconductive cell 2 is shown outside the block 1 to facilitate an easy understanding of the circuit diagram as a whole, but it should be understood that this photoconductive cell is one which actually is contained within this block 1. This photoconductive cell 2 is one, such as a CdS cell, which is superior in its relative visibility characteristic and in its stability to changes attributable to the lapse of time. The exposure control circuit 1 contains a delay circuit consisting of the photoconductive cell 2 and a capacitor 3; a trigger switch $SW_2$; an amplitude separation circuit or transistorized switching circuit indicated by a block 4; and an electromagnet 6 connected to the collector of an output transistor 5 for controlling the opening and closing movements of the shutter blades (not shown). As is well known, the control circuit 1 operates in the following manner. When the capacitor 3 is charged at a rate corresponding to the amount of light incident to the photoconductive cell 2 and when the terminal voltage of this capacitor 3 reaches a predetermined level, the switching circuit 4 is then actuated so that the state of the transistor 5 is switched from "on" to "off." During this mode of operation, the electromagnet 6 is rendered inoperative, and as a result, the shutter blades (not shown), which have until then been retained in their open state, are closed.

A luminescing element 7, such as a lamp is positioned to face the photoconductive cell 2 in such a way as will never block the passage of the light coming from the object to be photographed to said photoconductive cell 2. A transistor 8 is provided for lighting up the lamp 7. A variable resistor 9 regulates the intensity of light of the lamp 7 when the latter is lighted up. A variable resistor 10 and a capacitor 11 constitute a time constant circuit for causing the transistor 8 to be switched from its "cut-off" state to its "on" state at the end of a predetermined length of time following the switching action of a synchronizing switch $SW_3$ discussed later. A power source 12, and an external luminescent means 13 such as a flash bulb device as shown in FIG. 6a or a strobe device as shown in FIG. 6b, are provided. A power source switch $SW_1$ is provided. A trigger switch $SW_2$ is connected in parallel with the capacitor 3 of the control circuit 1 and is operative to cause the control circuit 1 to start its time-measuring action upon the opening of said trigger switch. A synchronizing switch $SW_3$ is operative so that its movable terminal $a$ which, in the normal state of said switch, is connected to a fixed terminal $b$, is switched over to another fixed terminal $c$ by a sector ring upon opening of the shutter blades (not shown). The terminals $a$ and $c$ are connected to the illumination-starting terminals $e$ and $f$, respectively, of an external luminescent means 13. A switch $SW_4$ is adapted to close interlockingly with the attachment of said external luminescent means 13 to the body of the camera.

A description follows of the function of the circuit shown in FIG. 1. In the event that an exposure is performed utilizing an external luminescent (flash) means 13, the switch $SW_4$ will be closed in the manner shown in FIG. 1 upon the attachment of the flash means 13 to the body of the camera (not shown). When the switch $SW_1$ is closed interlockingly with the shutter releasing operation during the initial stage of this releasing operation, the exposure control circuit 1 will be placed in the first operative state, and thus, the electromagnet 6 is energized. As a result, the member (not shown) for inhibiting the closing movement of the shutter blades is attracted to the electromagnet 6. On the other hand, the lamp 7 is lighted up to preliminarily irradiate the photoconductive cell 2. The intensity of light of this lamp 7 may be regulated by means of variable resistor 9. As the shutter releasing operation makes further progress and the shutter blades are opened, the trigger switch $SW_2$ of the control circuit 1 is opened by sector ring, so that this control circuit 1 starts measuring the brightness of the object to be photographed. In other words, the control circuit 1 is placed in the second operative state to effect an exposure for the purpose of taking a photograph. During this part of the operation, the shutter blades are opened and the connection of the movable terminal $a$ of the synchronizing switch $SW_3$ is switched from the fixed terminal $b$ to the fixed terminal $c$. Accordingly, the lamp 7 is put out, while the flash unit 13 is caused to luminesce. As a result of the aforesaid operations, the photoconductive cell 2 is preliminarily irradiated and is thus activated once before the flash unit 13 luminesces. As a result, the control circuit 1 can respond to the light reflected from the object illuminated by the flash, with hardly any appreciable delay. When the amount of light received by the photoconductive cell 2 upon the luminescing of the flash unit 13 has reached a predetermined value, the control circuit 1 is placed in its third operative state, i.e., the electromagnet 6 is de-energized to cause the shutter blades to be closed, thereby completing the exposure.

Also, in an exposure utilizing the flash unit 13, there may arise an instance in which the integrated amount of light received by the photoconductive cell 2 will not reach a predetermined value, depending on the condition of the object to be photographed, even after the lapse of a certain length of time, for example, one thirtieth of a second, which is accepted to be an exposure time free of the danger of developing a blur in photographs taken with a hand-held camera. In such an instance, it is possible to cause the transistor 8 to be placed in the "on" state at the end of the aforesaid certain length of time by preliminarily regulating the time constant circuit comprising the resistors 9 and 10 and the capacitor 11. By doing so, the lamp 7 will be caused to be lighted up again at the end of the lapse of a certain length of time independently of the synchronizing switch $SW_3$. As a result, the photoconductive cell 2 is again subjected to an irradiation. Therefore, the integrated amount of light received by the photoconductive cell 2 is forced to reach quickly the aforesaid predetermined level at the moment at which it is irradiated again. In such an instance, even if the amount of exposure which is given the film then is less than the proper amount which the film ought to receive under proper conditions, the shutter blades are instantaneously forced to close. Also, in case the flash unit 13 is a strobe device, an arrangement may be made, for example, so that the distance between the object and the film and the degree of opening of the diaphragm may both be set manually in accordance with the guide number. This will be convenient for obtaining a proper amount of exposure at a shutter speed lying within the range in which no blur due to hand-supporting of the camera takes place.

Figure 2:
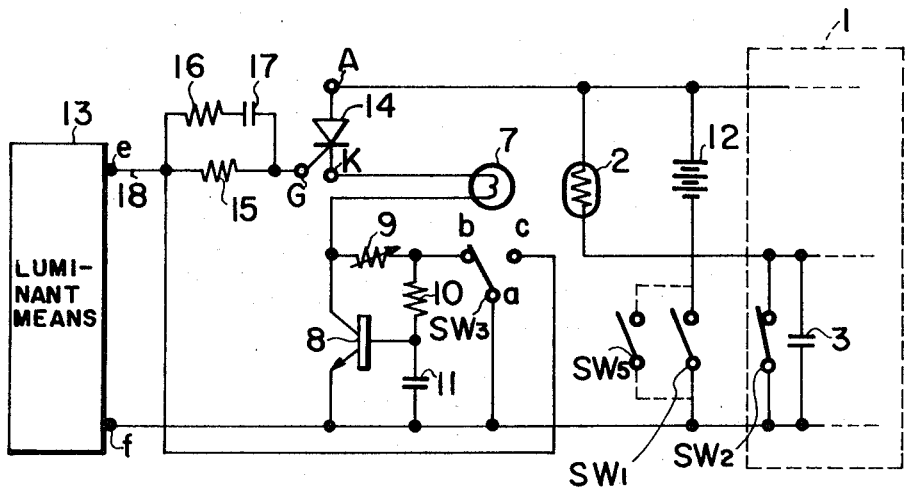
FIG. 2 is an electronic circuit diagram showing another embodiment of the present invention.

In FIG. 2, or in the description made referring to the drawings, similar parts which are operable in similar fashions are indicated by like reference numerals. Many of the component members contained in the exposure control circuit 1 are omitted for simplicity of explanation. However, by referring to FIG. 1, such omissions can be easily supplied.

The embodiment shown in FIG. 2 differs from the circuit arrangement shown in FIG. 1 in that a silicon controlled rectifier 14 (hereinafter to be abbreviated simply as SCR), having an anode electrode A, a cathode electrode K and a gate electrode G is connected in series with the lamp 7. Resistors 15 and 16 and a capacitor 17 are connected to the gate electrode G of the SCR 14, which is assigned to control the lighting up of the lamp 7. The serial circuit comprising the resistor 16 and the capacitor 17 causes the SCR 14 to effect its action with an improved sureness. The junction point between the resistor 15 and the resistor 16 is connected by a lead wire 18 external terminal $e$ of the flash unit 13.

In FIG. 2, when the exposure utilizes the flash unit 13, unit 13 is attached to the camera manually and also the connection terminals $e$ and $f$ are inserted in the synchronizing base of the camera. In this state of the camera, there appears a voltage of at least three volts from the battery and a capacitor in unit 13 where unit 13 is a conventional flash bulb unit, or a voltage of a maximum of 300 volts will appear from a battery and a capacitor in unit 13 where unit 13 is a strobe unit. This voltage appears at the terminals $e$ and $f$ of the unit 13. This circuit arrangement is identical with that shown in FIG. 1 with respect to the fact that the terminals $e$ and $f$ are directly closed by the synchronizing switch $SW_3$, usually in accordance with the opening movement of the shutter blades. In the instant embodiment, however, in addition to the aforesaid action, the voltage discussed above is applied first to the gate electrode G of SCR 14 through the resistor 15. As a result, this SCR 14 is made ready to be actuated, and accordingly, the lamp 7 is made ready to be lighted up.

Description will hereunder be made of the actions of this embodiment. In the initial part of the shutter releasing operation, the power source switch $SW_1$ is closed interlockingly with this shutter releasing operation. In case the flash unit 13 is not out of order and is in the condition in which it can operate properly, the SCR 14 will be turned "on" by the voltage applied between the terminals $e$ and $f$ in the manner discussed previously. As a result, the lamp 7 is lighted up. This lighting up of the lamp 7 not only preliminarily irradiates the photoconductive cell 2, but also it serves as a signal to the photographer, informing him that the flash unit 13 works properly. If, on the other hand, the flash unit 13 is out of order, there no open-circuit voltage will appear on the terminals $e$ and $f$. As a result, SCR 14 will be placed in the "cut-off" state. Accordingly, the lamp 7 will not be lighted up, and thus the photographer will become aware that the flash unit 13 is out of order. In such a case, the photographer can decide whether to continue without the assistance of the flash unit 13, based on the condition of the lighting up of the lamp 7. The rest of the actions of the apparatus of this embodiment which are carried out in normal operation is identical with that discussed in connection with the first embodiment shown in FIG. 1. In the embodiment of FIG. 2, lamp 7 is lighted up when the power source switch $SW_1$ is closed by the shutter release operation. In this stage, as the synchronizing switch $SW_3$ has its moveable terminal $a$ connected to the fixed terminal $b$, the limiting resistor 15, having a resistance of a few megohms, is inserted between the terminals $e$ and $f$ of flash unit 13 via the gate electrode of SCR 14. Thus, flash unit 13 will be prevented from unnecessary luminescing. Determination that flash unit 13 is not out of order is made not only by the closure of the power source switch $SW_1$ during the initial part of the shutter release operation, but also it can be made by operation of an extra switch connected in parallel with switch $SW_1$ which is independent of the shutter release operation, for example, by the operation of switch $SW_5$ provided locally in the body of the camera.

In FIG. 3a, there is shown a circuit connection comprising a pair of transistors 19 and 20 which is equivalent to the SCR 21 illustrated in FIG. 3b. As will be understood directly from the drawings, the SCR 14 shown in FIG. 2 may be replaced by the pair of transistors 19 and 20 shown in FIG. 3a.

In FIG. 4, there is shown an example in which the lighting up of the lamp 7 is effected by transistors. The switch $SW_4$ shown in FIG. 1 is omitted in FIG. 4. In FIG. 4, transistors 22, 23, and 24, resistors 25 and 26, and a capacitor 27 are provided. The time constant determined by the resistors 9, 10 and the capacitor 11 is set to have a value smaller than the value of the time constant circuit comprising resistor 26 and capacitor 27. This difference between these two time constants is necessary for the lamp 7 to accomplish its sequential actions starting from being lighted up until it is put out, which will be discussed later.

In the embodiment shown in FIG. 4, the conditions for the action thereof (in which the transistor 22 may or may not be turned "on" state via the resistor 15 in accordance with the presence or absence of the voltage at the terminals $e$ and $f$ depending on either the proper operation condition or the presence or absence of disorder of the flash unit 13) are exactly the same as the conditions in the embodiment shown in FIG. 2 in which the SCR 14 may or may not be rendered to the "on" state. Where there is no disorder in the flash unit 13, the mode of operation will be such that, when the power source switch $SW_1$ is closed at the initial stage of the shutter release operation, the exposure control circuit 1 will be placed in its first operative condition. In this condition, the member for inhibiting the closing motion of the shutter blades is attracted to the electromagnet 6 and retained there. Accordingly, when the shutter blades are opened, this member will make it possible for the shutter blades to be held in their open positions. In this particular part of operation, the transistor 22 is already turned "on" by the voltage between terminals $e$ and $f$ of flash unit 13. Accordingly, the transistor 23 is placed in its "cut-off" state, whereas the transistor 24 is placed in its "on" state. As a result, the lamp 7 is lighted up, giving a preliminarily irradiating the photoconductive cell 2. As the shutter release operation makes a further progress, the trigger switch SW₂ of the exposure control circuit 1 as well as the shutter blades (not shown) are both opened, so that said control circuit 1 will be placed in the condition in which it starts measuring of the intensity light, or in other words, the condition under which an exposure is to be made. During this part of operation, the connection of the synchronizing switch SW₃ is switched from the terminal b to the terminal c, so that the lamp 7 is put out and the flash unit 13 is allowed to luminesce. This luminescence will result in an activation of the photoconductive cell 2. If the external luminescent source 13 is a flash device, the photoconductive cell 2 will respond with hardly any appreciable delay to the light reflected from the object being illuminated by the flash. Accordingly, when the integrated amount of light received by the photoconductive cell 2 reaches a predetermined level, the control circuit 1 will de-energize the electromagnet 6 to close the shutter blades.

In the embodiment of FIG. 4, transistor 22 is "cut-off" when synchronizing switch SW₃ is switched to terminal c, while transistor 23 maintains its "cut-off" state until the passage of the time constant period determined by resistor 26 and capacitor 27, so that, during this period of time, transistor 24 stays conductive. Thus, when the light reflected from the object being photographed is weak and electromagnet 6 is not de-energized by control circuit 1 by the small amount of reflected light, the time constant determined by resistors 9 and 10 and the capacitor 11 is set to have a value smaller than that of the time constant of resistor 26 and capacitor 27, whereby transistor 8 becomes conductive before transistor 23. As a result, the lamp 7 will be lighted up again so that the photoconductive cell 2 will be irradiated. Accordingly, the integrated amount of light received by the photoconductive cell 2 will quickly reach the aforesaid predetermined level. Even where the amount of exposure is insufficient, the shutter blades may be closed at the end of an exposure time lying within the range in which no blurring due to hand-supporting of the camera is caused.

After closure of the shutter blades, the transistor 23 is placed in the "on" state by the time constant which is determined by the resistor 26 and the capacitor 27. Accordingly, the transistor 24 is rendered to the "cut-off" state, and the lamp 7 is put out. Thus the consumption of power due to unnecessary lighting up of the lamp 7 may be prevented. However, if the electronic shutter is of the type in which the power source switch SW₁ is opened as the result of the closure of the shutter blades, the putting out of the lamp 7 by utilizing the aforesaid time constant circuit will be unnecessary.

It should be understood that the present invention is not limited to the aforesaid embodiments, but that many other modifications may be conceived by those skilled in the art without departing from the scope of the appended claims.

I claim:

1. In an exposure-control circuit for controlling exposure in a camera, comprising a photoconductive cell for measuring the intensity of light reflected from an object being photographed, and a flash unit being operated at a given instant to illuminate the object, the improvement comprising:
    A. a switch means for providing power to operate the lamp, and
    B. a timing circuit for operating said switch means to cause the lamp to illuminate said cell again when a predetermined time has passed since said given instant,
    whereby sufficient additional light is provided to the photoconductive cell to cause the exposure-control circuit to terminate said exposure after said predetermined time, even if said reflected light is insufficient to terminate the exposure.

2. An exposure control apparatus for a photographic camera comprising:
    A. a photoconductive cell,
    B. a power source connected to said photoconductive cell,
    C. a power source switch connected to said power source,
    D. a luminescing member disposed opposite said photoconductive cell and connected to said power source,
    E. a first fixed terminal connected to said luminescing member,
    F. a movable terminal connected to said power source via said power source switch and means to connect it to said first fixed terminal upon a shutter release operation to light up said luminescing member, thereby preliminary irradiating said photoconductive cell,
    G. an external luminescent means connected to said movable terminal,
    H. a second fixed terminal connected to said external luminescent means and means to connect it to said movable terminal synchronously with a shutter-blade opening action,
    I. a first transistor having a collector electrode connected to said luminescing member and the emitter electrode connected to said movable terminal, and operable to effect switching to light up again said luminescing member after a predetermined time,
    J. a first resistor connected between the collector electrode and a base electrode of said first transistor, and
    K. a first capacitor connected between the emitter electrode and the base electrode of said first transistor, and constituting a timing circuit with said first resistor for controlling said predetermined time, whereby sufficient additional light is provided to the photoconductive cell to cause the exposure-control circuit to terminate said exposure after said predetermined time, even if a reflected light is insufficient to terminate the exposure.

3. An exposure control apparatus according to claim 2, further comprising a variable resistor connected between said luminescing member and said first fixed terminal.

4. An exposure control apparatus according to claim 2, further comprising a switch connected between said power source switch and the emitter electrode of said first transistor, said further switch being closed upon the attachment of said external luminescent means to said camera.

5. An exposure control apparatus according to claim 2, in which said first resistor is a variable resistor.

6. An exposure control apparatus according to claim 2, further comprising:

A. a semiconductor switching element having an anode electrode connected to said photoconductive cell and a cathode electrode connected to said luminescing member, and
B. a second resistor connected between the gate electrode of said semiconductor switching element and said second fixed terminal.

7. An exposure control apparatus according to claim 6, in which said semiconductor switching element is a silicon controlled rectifier, and said apparatus further comprises a third resistor and a second capacitor connected in series with each other and in parallel with said second resistor.

8. An exposure control apparatus according to claim 2, further comprising:
A. a second transistor having a collector electrode connected to said power source and an emitter electrode connected to said luminescing member,
B. a fourth resistor connected between the base electrode and the collector electrode of said second transistor,
C. a third transistor having a collector electrode connected to a base electrode of said second transistor and an emitter electrode connected to said power source via said power source switch,
D. a third capacitor connected between the base electrode and the emitter electrode of said third transistor,
E. a fourth transistor having a collector electrode and an emitter electrode connected respectively to the base electrode and the emitter electrode of said third transistor,
F. a fifth resistor connected between said fourth resistor and the collector electrode of said fourth transistor and
G. a sixth resistor connected between said second fixed terminal and the base electrode of said fourth transistor.

* * * * *

UNITED STATES PATENT OFFICE
CERTIFICATE OF CORRECTION

Patent No. 3,690,229        Dated September 12, 1972

Inventor(s) Tomio Kikuchi, et. al.

It is certified that error appears in the above-identified patent and that said Letters Patent are hereby corrected as shown below:

On the cover sheet, item [73], "Kabushiki Kaisha Kofaru" should read -- Kabushiki Kaisha Koparu -- .

Signed and sealed this 2nd day of January 1973.

(SEAL)
Attest:

EDWARD M. FLETCHER, JR.        ROBERT GOTTSCHALK
Attesting Officer        Commissioner of Patents